United States Patent [19]

Huffman

[11] Patent Number: 5,366,203
[45] Date of Patent: Nov. 22, 1994

[54] PROJECTOR CEILING LIFT

[75] Inventor: Charles E. Huffman, Parker, Colo.

[73] Assignee: Safety Lock and Lift, Ltd., Aurora, Colo.

[21] Appl. No.: 94,699

[22] Filed: Jul. 22, 1993

Related U.S. Application Data

[63] Continuation of Ser. No. 768,033, Sep. 30, 1991, Pat. No. 5,261,645, which is a continuation-in-part of Ser. No. 387,118, Jul. 3, 1989, abandoned.

[51] Int. Cl.$^5$ .................. A47B 81/00; A47B 88/22
[52] U.S. Cl. .................. 254/362; 248/277; 248/329; 254/267; 312/23
[58] Field of Search .................. 248/277, 329, 324; 182/236, 239; 254/267, 362; 312/21, 22, 23, 27, 247, 273

[56] References Cited

U.S. PATENT DOCUMENTS

| | | | |
|---|---|---|---|
| 936,681 | 10/1909 | Union | 248/324 |
| 1,819,516 | 8/1931 | Kelly | 312/247 |
| 1,964,339 | 6/1934 | Brassell | 248/329 |
| 2,435,755 | 2/1948 | Schimpff . | |
| 2,933,198 | 4/1960 | Firestone | 248/324 |
| 3,032,308 | 5/1962 | Hansen | 248/329 |
| 3,759,475 | 9/1973 | Brown | 248/277 |
| 4,060,292 | 11/1977 | Medina | 312/247 |
| 4,313,208 | 1/1982 | Kavenik | 455/42 |
| 4,412,601 | 11/1983 | Cooper | 187/27 |
| 4,556,155 | 12/1985 | Koppensteiner | 254/267 |
| 4,684,164 | 8/1987 | Durham | 296/37.7 |
| 4,830,147 | 5/1989 | Kawada | 187/8.62 |
| 4,843,782 | 7/1989 | Gustaveson | 52/39 |
| 4,941,718 | 7/1990 | Alexander | 312/27 |
| 5,261,645 | 11/1993 | Huffman | 254/267 |

OTHER PUBLICATIONS

"Datalift" brochure, Display Devices Inc., Jul. 31, 1989.

*Primary Examiner*—Katherine Matecki
*Attorney, Agent, or Firm*—James E. Pittenger

[57] ABSTRACT

A remote control, ceiling mounted lifting device is provided for concealing, supporting and providing floor level access to audio visual objects such as color video/data projectors. The overall height of the lifting device is extremely shallow to allow the device to be mounted and concealed within the ceiling clearance area. The device has an outer frame with an open inner section. A support carriage is provided which is sized to fit and nest with the open inner section of the support framework. The carriage has an inverted U-shaped structure which allows the projector to be recessed upwardly within the confines of the carriage. A scissor-like stabilizer mechanism is mounted on each side of the carriage and support structure. These stabilizer mechanisms are located on the outer edges of the device to minimize the overall height of the device. This double linkage mechanism stabilizes the carriage during movement and use and yet allows the projector to be recessed within the ceiling structure when the carriage is retracted. Cable supports on either side of the carriage are mounted to a motor driven cable drum assembly which is laterally positioned at the top of the support structure. The drum mechanism is positioned to substantially align with the center of gravity of the loaded carriage. An emergency locking brake assembly is provided in conjunction with the cable drum to prevent the carriage from dropping in an emergency situation. A low voltage remote control system which can use infra-red sensors for signal transmission is used for controlling the operation of the lifting device.

15 Claims, 4 Drawing Sheets

Fig_1

Fig_2  Fig_3

Fig_4

Fig_5

Fig_6

Fig_7

Fig_8

Fig_9

Fig_10

PROJECTOR CEILING LIFT

RELATED APPLICATION

This is a continuation of patent application Ser. No. 768,033, filed Sep. 30, 1991, now U.S. Pat. No. 5,261,645, which is a continuation-in-part of patent application Ser. No. 387,118, filed Jul. 3, 1989, now abandoned.

FIELD OF THE INVENTION

This invention is directed to a lifting device for suspending a concealed projector or other device from the ceiling of an auditorium or other structure. It is more specifically directed to a stabilized lifting arrangement for supporting and suspending a concealed video or motion picture projector from a recessed position within the ceiling of an auditorium or other structure while providing floor level access for servicing.

BACKGROUND OF THE INVENTION

In the past there has been a strong desire to recess and conceal various types of audio visual equipment within the confines of a room or vehicle which is used for presentations. While some projectors are mounted permanently on structures within the room, others in more sophisticated settings have been concealed or hidden in the walls, floor or ceiling of the structure.

As is well known in theaters, the motion picture projectors are usually concealed in a separate enclosed room behind a glass partition at the back of the theater so that the projected image can be placed on a screen within the presentation area. This method is quite adequate with respect to high powered projection equipment, such as movie projectors or slide projectors having long focal length lenses.

The situation changes drastically when it is desired that television projectors or computer display projectors are to be used. These devices, when they are used in presentation rooms, theaters or auditoriums must be quite large to match the environment in order to be able to project a display which is large enough for the audience to easily see. It is normally required that these projectors be positioned closer to the screen and in front of the screen to reduce or eliminate distortion in the corners or outer areas of the display. As a result, it is generally necessary to position these types of projectors essentially in the middle of the room directly in front of the screen. This means the projector is elevated above the floor of the auditorium usually on a support tower or in some cases they can be suspended from the ceiling and generally in the middle of the floor area. Naturally, this type of positioning for a projector is quite distracting and destroys the decor or ambiance of the area, especially when the equipment is not in use.

The present inventor has been a pioneer in the attempt to solve this problem by devising lift structures which can be attached to the ceiling of the area and which can allow the projector to be remotely raised or lowered from the ceiling surface. When use of the projector is required the projector can be lowered on cables to the required "show" position. A projector of this type which is suspended below the ceiling naturally is still quite obtrusive and consequently this type of suspension is undesirable.

Attempts have been made by the present inventor to recess the projector within the ceiling but because of the mass of the mechanism required for the lifting device it has been difficult up to this point to be able to provide a satisfactory arrangement for this purpose. The primary limitation with this type of lifting device is due to the fact that there is usually a very small dimensional clearance available between the ceiling of the auditorium or room and the above floor or roof structure. In many cases, this clearance is no more than fifteen to eighteen inches and in many cases this amount of clearance prevents any type of lift mechanism, especially those involved with a television projector, to be concealed within the ceiling.

This patent application is directed to a new solution to eliminate the problems which have been encountered in the past with this type of mechanism and for this reason this application is directed to a very unique lifting structure which has considerable value and importance in this field.

INFORMATION DISCLOSURE STATEMENT

This statement is provided in order to comply with the inventor's acknowledged duty to inform the Patent Office of any pertinent information of which he is aware that would be of value or have importance in the examination of this application. This statement is not to be construed that a patentability search has been performed by the applicant or that the applicant is aware of other pertinent prior art which has been discounted.

The Schimpff patent (U.S. Pat. No. 2,435,755) shows a scissor type load lifting mechanism which is mounted on an oval trolley track which is an apparatus used for displaying accessories and articles in motor vehicle service stations.

The Gustaveson, et al patent (U.S. Pat. No. 4,843,782) discloses a television receiver which is concealed within the ceiling of a structure. A cable supported door provides a ceiling panel which can be lifted by a motorized drum for viewing the television receiver.

The patent to Kavenik (U.S. Pat. No. 4,313,208) discloses a ceiling mounted projector for vehicles. Although this patent includes very complex electronic circuits for projecting electromagnetic radiation, it also discloses a ceiling mounted projector for television or movies.

The Cooper patent (U.S. Pat. No. 4,412,601) discloses an elevator storage unit which is positioned in an above-ceiling enclosure. The bottom of the cable mounted platform defines the closure for the ceiling opening and the platform can be raised or lowered by use of a cable mechanism. Corner guides are provided for aligning the platform to engage and fit the ceiling opening.

The Kawada patent (U.S. Pat. No. 4,830,147) discloses a scissor type jacking device that is mounted on the floor. This device is concealed within a floor pit and includes two pairs of mechanical links for simultaneous movement in parallel vertical planes. A platform mechanism is held in a horizontal position during the raising and lowering of the platform. A slidable cover which is mounted on guides is used to cover the floor pit area when the mechanism is retracted.

The Brown patent (U.S. Pat. No. 3,759,475) shows a scissor type double linkage mechanism which is used for horizontally extending or retracting a rack mounted electronic module. This mechanism is intended to be mounted on a side wall so that the module is extended and retracted in a horizontal direction.

SUMMARY OF THE INVENTION

The present invention uses a number of new and novel features and elements to provide a lifting device for relatively heavy objects and the concealment of the object within a ceiling when not in use. A relatively low structural clearance area is provided above the ceiling surface found in an auditorium or presentation room. The minimum height of the ceiling clearance area that can accommodate the structure for a lift is in the range of fifteen to eighteen inches. In the present lifting device the structural members for a support framework are arranged around the peripheral edges of the framework leaving the center area relatively open. A motor and cable drum assembly is transversely supported on the upper surface of the support framework or in some cases where clearance is critical the motor assembly can be recessed along the side or within the upper limits of the framework. A double drum cable arrangement is provided on a drive shaft which positions each drum near the outer edge of the structure. Mounted to opposite side rails of the support framework are two scissor-like folding linkage mechanisms. This double linkage arrangement is provided to stabilize a lifting carriage of the device to prevent it from moving horizontally during use.

The lifting carriage is an inverted U-shaped structure which essentially surrounds the upper portion of the object to be lifted. This allows the object to be recessed upwardly within the carriage structure as well as the support framework to minimize the overall height of the lifting device to allow it to be fully recessed and concealed within the ceiling. A ceiling cap or cover to close and conceal the ceiling opening is provided. This cover can be adjustably suspended from or attached to the lower surface of the object or carriage for convenience.

Throughout this application, the object mentioned can be any device which is required to be recessed and/or concealed within the ceiling of a room or area and lowered to the floor of the area as required or any position there between.

One of the primary purposes of the lifting device that is shown and described in this application is to support an overhead video/data projector which is usually used in conjunction with a large screen in an auditorium or a large presentation area. By the same token, the object can also be a television receiver as well as a movie projector, slide projector or remote "overhead" projector. For illustrative purposes throughout this application the Improved Lifting Device will be described in conjunction with a color video/data projector which is essentially quite large and heavy. The weight of this type of projector can range anywhere from 200 to 400 pounds or more. Thus, a reliable lifting device having considerable lifting capacity and safety considerations is provided.

The present invention provides unique features in that the projector can be lowered to a proper position suspended from the ceiling so that the projector is aligned properly and stabilized with respect to the screen. It is desirable to centrally locate the projector precisely with respect to the screen to minimize distortion and to enhance the quality of the display that is being presented. In addition to this, and even with the limitations with respect to ceiling clearance, the lift according to the present invention is capable of extending to floor level to greatly increase the ease with which the projector can be installed, repaired and removed from the lifting device. Thus, the present lifting device is capable of providing the stabilization and at the same time, the extended reach that is required for this type of presentation.

BRIEF DESCRIPTION OF THE DRAWINGS

FIG. 1 is a perspective view showing the improved projector lifting device and a projector partially lowered from a ceiling enclosure;

FIG. 2 is a side view with the projector location shown in phantom lines;

FIG. 3 is a front view;

FIG. 4 is an enlarged cross-sectional view taken along lines 4—4 of FIG. 3;

FIG. 5 is a perspective view showing the carriage structure suspended below the support framework;

FIG. 6 is a partial perspective view of a drum locking mechanism according to the present invention;

FIG. 7 is a pictorial diagram showing the locking arm in a raised position during normal lowering of the carriage;

FIG. 8 is a pictorial view showing the pawl extended by centrifugal force upon high speed rotation of the cable drum;

FIG. 9 is a pictorial view showing the locking arm pulled in to contact with the brake lock to hold the drum in a fixed position to prevent lowering of the carriage.

DETAILED DESCRIPTION OF THE INVENTION

Turning now more specifically to the drawings, FIG. 1 is a perspective view showing the improved projector lifting device 10 according to the present invention extending downwardly through an opening Q provided in the ceiling C of an auditorium or presentation room. The opening that is required in the ceiling structure for the lifting device is determined by the overall size of the presentation room or auditorium and the distance that the lift must extend from the ceiling to the floor or near the floor of the room. In addition, the overall size of the lift is varied according to the size and weight of the projector that is to be used. A framework and carriage having outer dimensions of 36" by 36" has been found to be adequate to accommodate most of the larger projectors presently used.

The significant consideration in installation and use of a device of this type is the lateral clearance that is provided between the floor or roof joists of the ceiling structure and how much clearance height is available between the ceiling surface and the floor or roof above. In many cases, this clearance height may range only between 15–18 inches. One of the most critical features of the lift according to the present invention is its ability to accommodate the large projectors which are intended to be used and still allow these projectors to be concealed and positioned within the ceiling structure. Thus, the overall height of the present invention is critical in order to obtain the desired novel results.

Two main components make up the overall structure for the present lifting device. The first component is defined by support framework 12 which is rigidly mounted to either the floor joist or cross members making up the building ceiling structure. The second component is a carriage structure 14 within which the projector P is mounted. The carriage structure 14 is suspended from the support framework 12 by cables 20, 22 extending from an elongated cable drum 30 mounted on the top surface of the framework 12. A drive motor 28 is drivingly connected to the cable drum 30. The cables 20, 22 extend from each end of the drum 30 and are mounted directly to the side frames or rails of the carriage structure 14. A pair of tong or scissor-like stabilizer mechanisms are provided on each side of the structure between the framework 12 and carriage 14 to hold the carriage in a relatively rigid lateral position when suspended. The stabilizer mechanisms 16, 18 are intentionally positioned on the outer edges of the support framework and carriage structure to minimize the interference between the components and minimize the overall height requirement of the lifting device. In this way, the projector P is substantially positioned upwardly between the lower ends of the stabilizer mechanisms 16, 18 to reduce the overall clearance requirements and is supported on mounting bracket 26.

It is to be understood that while throughout this application reference will be made to the lifting and positioning of a large, relatively heavy color video/data projector the lifting device 10, according to the present invention, is not to be restricted to this specific type of use. It could be used for many purposes, such as the lifting and positioning of television receivers, movie projectors, slide projectors, remote controlled overhead projectors and any other object where it is desirable or necessary to conceal the object within the ceiling of an enclosure, and when in use suspend the object to some point at or above the floor.

The present preferred embodiment as described herein, has been used with various types of color video/data projectors, such as the Sony Model 1270 Projector, the General Electric Imager Model 210 and the Barco Projector Model 1000. Some of these projectors can weigh as much as 300–400 pounds and thus, present a considerable problem in the mounting and supporting of the unit. The structure of the present invention as will be described in more detail not only conceals the projector within the ceiling, but has the capability even in limited ceiling clearance space to extend the projector all the way to or near the floor of the auditorium or presentation area. This is quite important with a projector of this size in order to be able to install and mount the projector in the carriage structure as well as to be able to remove the projector from this structure. In the same way, the projector can be lowered within easy reach of a repair person so that adjustments and repairs to the projector can be easily made while the projector is still installed in the carriage structure.

FIG. 5 shows an enlarged view of the lifting device in an extended position. At the same time, FIG. 2, 3 and 4 show the lifting device in the retracted or concealed position. These figures show the preferred embodiment of the invention and, for clarity in describing the details of the mechanism, reference will be primarily directed to FIG. 5. Additional reference can be made to the views shown in FIGS. 2, 3 and 4.

The support framework 12 is composed of side members 32, 34 and cross members 36, 38. A relatively square or rectangular rigid frame is provided. These elements can be manufactured from low carbon steel channels which may have a flange dimension of between 2–4 inches. The size of these channels is determined by the overall structural requirements and the projector weight anticipated. The cross member 36 is positioned at or near the ends of the side rails 32, 34, while the opposite cross member 38 can be positioned at the ends or recessed inwardly from the outer ends of the side rails. Mounting tabs 40, 42 are fixedly attached in a downward position with respect to the ends of the side rails 32, 34 respectively. Mounting holes 44 are strategically positioned along the side rails 32, 34 and arranged to receive elongated bolts or support stanchions which can be suitably mounted on the building ceiling structure illustrated by the beam 46. Rail supports 48, 50 are fixedly mounted along the under portion of the side rails 32, 34 respectively. The rail supports 48, 50 include guides 52, 54 which are supported by brackets 56, 58. A small clearance gap or slot 60, 62, respectively, is provided between the side rails 32, 34 and the guides 52, 54.

An electrical control box 54 can be mounted to the side of the cross member 38 in any position desired. For illustrative purposes in FIG. 5, the control box 54 is centrally positioned along the cross member 38 to accommodate the electrical components which are required for the operation of the device. In addition, the support cable drum 30 is mounted laterally across the framework 12 and is fixedly mounted on shaft 66 which is rotatably mounted in bearing brackets 68, 70 which in turn are mounted on the top surfaces of side rails 32, 34, respectively. A motor mounting bracket 74 is attached to the cross member 38 and to the side rail 32. A motor-gear box assembly 28 is mounted on the bracket 74. The mounting bracket 74 has a suitable slot arrangement to allow the movement of the motor with respect to the cable drum 30 so that it can be positionally adjusted with respect to the drum. A chain drive 72 interconnects a sprocket on the motor assembly 28 and a larger diameter sprocket on the cable drum 30. In this way there is a rigid direct drive connection between the motor and drum for safety purposes. A magnetic brake 76 can also be mounted on the motor assembly 28 opposite the chain drive 72 to provide a rigid lock to prevent the motor 28 and drum 30 from rotating when the motor is deenergized.

At the opposite end of the cable drum assembly 30 from chain drive 72 is located a drum safety lock 78 which prevents the drum assembly 30 from rotating uncontrollably which in turn would allow the carriage and mounted projector to descend rapidly or fall if a catastrophic failure occurred in the motor drive assemble. The safety lock 78 will be described in more detail at a later point in this application.

The carriage structure 14 is comprised of side members 80, 82 and cross brace 84. All three of these components can be angle iron type structural members having a suitable length and width for the intended purpose. The length of the side members is usually determined by the weight and size of the projector which is intended to be used and the length of the reach that is required for the carriage. The cross brace 84 can be bolted to the ends of the side members 80, 82 and can be included or omitted as desired depending upon the length of the projector that is anticipated. The cross brace 84 is primarily intended to stabilize and hold the side members rigid while supporting the projector. The bottom flange of each of the side members 80, 82 extend inwardly as shown in FIG. 5. Holes are provided in the bottom flanges near their ends and elongated, threaded bolts or rods 86 and nuts 92 can be positioned in each one of the mounting holes. Elongated mounting brackets 88, 90 can be attached to the upper surface of the ceiling enclosure cover 24 by use of suitable fasteners or adhesives. In most cases, the mounting brackets 88, 90 will be spaced apart the same distance as the side members 80, 82 of the carriage structure 14. In addition, the length of the mounting brackets 88, 90 will usually correspond to and have the same length as the side members 80, 82. The threaded rods or bolts 86 are attached at their lower ends to the respective mounting brackets 88, 90 to support the cover 24 below the carriage structure. Nuts 92 are threaded on the ends of the rods 86 and are positioned and adjusted to allow the cover 24 to be suspended below the carriage and yet close and conceal the ceiling opening when the carriage is fully retracted within the ceiling enclosure.

Projector mounting blocks 94, 96 are fixedly mounted in an upward direction from the flanges of the side members 80, 82. A cross support member 98 is mounted on the upper ends of the blocks 94, 96 and straddle the area between the side members 80, 82. The two channels making up the cross support member 98 are positioned back-to-back and are spaced apart approximately one-fourth to three-eighths of an inch to provide a slotted area along the full length of the member 98. The mounting blocks 94, 96 can be angle iron or channels which are welded or fixedly attached to the side members 80, 82, respectively. Usually the height of the mounting blocks 94, 96 is determined by the type of projector which is intended to be used. The mounting blocks and cross member are positioned approximately intermediate of the length of the side members 80, 82 at a position which will approximately correspond to the center of gravity of the projector that is installed. In conjunction with the cross member, customized mounting brackets 100, 102 intended for the specific projector are suspended from the cross member 98 on suitable bolts which are positioned through the slotted opening provided in the cross member 98. In this way, the mounting brackets can be adjustably positioned along the width of the cross member to accommodate the projector. At the same time, an elongated slot arrangement can be provided in the upper flanges of the mounting brackets 100, 102 to allow the brackets to be adjusted in a forward or rearward direction to properly adjust the position of the projector so that the center of gravity will be slightly ahead of the cross support member of the carriage lifting structure.

A pair of eye bolts 104 are threadably mounted through the bottom flanges of the side members 80, 82 at a point which is approximately one and one-half to two inches forward of the position of the mounting blocks 94, 96. The ends of the cables 20, 22 are directed through the eye bolts 104 and are held in position by suitable clamps or other devices. The positioning of the eye bolts 104 and the mounting blocks 94, 96 is carefully determined to adequately support and mount a wide range of projectors with which the lifting device can be used. Because of the stabilizing mechanisms which will be described next the positioning of these components is not absolutely critical so long as the center of gravity of the mounted projector remains within a reasonable envelope established by the position of these components.

The cable ends 20, 22 are actually the ends of a continuous cable that is used in the fabrication of the lifting device. In other words, the installation of the cable is established by attaching one end to one of the eye bolts 104 with the other end threaded upward and around the respective end of the cable drum assembly 30 and then passing through two pairs of aligned holes 106, 108 which are spacedly positioned through the drum near its central portion. The spacing between the pairs of holes 106, 108 is approximately six inches. In this way, the cable passes through the drum, runs along the center section of the drum and then passes back through the drum and around the opposite end of the drum assembly. At this point the cable is directed downward from the drum to the second eye bolt 104 where the end is attached. A suitable pinch clamp 110 is bolted to the center of drum, adjacent to the cable, so as to clamp the cable in a rigid position. In this way, there are no loose cable ends to come loose on the cable drum assembly. With the center clamp provided on the drum, if one side 20 or 22 of the cable breaks or is severed, the other side will still remain intact and support the carriage structure.

The carriage side members 80, 82 include upwardly extending mounting tabs 112,114 which are positioned near the forward end of the side members. At the opposite ends of the side members 80, 82 are located upwardly extending rail supports 116, 118, respectively. The rail support 116 includes guide 120 which is spacedly positioned by brackets 124,126 which extend upwardly from the flange of the side member 80. A narrow slotted area 128 is provided between the guide 116 and the upper surface of the side member 80. By the same token, the rail support 118 on the opposite side includes guide 122 which provides a similar slotted area 130.

The stabilizer mechanisms 16, 18 are provided on the extreme outer edges of the support framework 12 and carriage structure 14. For ease of illustration a detailed description of one of the stabilizer mechanisms will be provided to show the interconnection of the stabilizer mechanism with respect to the support framework and carriage structure. It is to be understood that the same explanation can be provided for the opposite stabilizer mechanism.

The stabilizer mechanism 18 is composed of a series of scissor-like links which are pivotally attached at their outer ends to each adjacent link. The corresponding mid-point of intersecting links are also pivotally attached. Each link is nothing more than an elongated, fairly narrow bar of suitable material which has mounting holes at each end and in the middle. It is important that the distance between the bolt holes be equal on all of the links. The links are attached together as shown in FIG. 5, to provide a scissor-like mechanism extending between the support framework and the carriage structure. The upper end of the upper most link is pivotally attached to the mounting tab 40 extending downwardly from the side rail 32. This attachment can be made by any suitable device such as a permanent rivet or a threaded bolt which has a suitable secured nut or fastening device. The corresponding upper cross link 130 has an aperture at its outer end and a suitable pivoting roller bolted to the outer end. The roller 132 is a relatively thin disk having a concave groove or slot provided around the entire circumference. A center mounting hole is used to attach the roller 132 to the outer end of the link 130 so that it will easily rotate. The overall inner diameter of the circumference of the roller 132 is sized slightly less than the slot 60 provided between the guide 48 and the lower edge of the side rail 32. In this way, the end of the link 130 is positioned so that it can move smoothly along the side rail slot 60 so as to adjust for the constantly changing dimension between the ends of the upper link and cross link as the mechanism and carriage are extended or retracted.

In the same way, the lower link 134 is pivotally attached to the tab 112 and the outer end of the lower cross link 136 includes a similar roller 138. The roller 138 is again sized to fit within the slotted area 128 provided by the rail support 116 and the side member 80. The dimensions between the rollers and the slotted areas should have a close tolerance to eliminate as much relative movement between the mechanism and the carriage structure and the support framework. The opposite stabilizer mechanism 16 is a mirror image of the mechanism just described.

It is important to note that both of these stabilizer mechanisms are on the extreme outer edges of the support framework and the carriage structure. This allows the projector to be recessed upwardly between the stabilizer mechanisms and the carriage structure to substantially minimize the ceiling clearance required for installation of the lifting device. In this way, the total height of the device can be substantially reduced. By moving the cable drum assembly 30 and cables 20, 22 forward of the cross support member 98 it is possible to obtain further clearance so that the cross support member 98 can be recessed even further upwardly within the support framework structure.

In the preferred embodiment of the present invention, the center to center dimension of the end holes of the links provided for the stabilizer mechanisms are approximately thirty-six inches. The center pivot hole is spaced inwardly an equal distance. The number of pairs of links that are provided are determined by the total length that the carriage structure is intended to extend below the support framework. Thus, each lifting device can be customized for the location in which it is intended to be installed. With the links having a total distance of approximately thirty-six inches between bolt centers, it is found that each set of links can extend approximately twenty-seven inches. For this reason, it is necessary to include four sets of links if a total reach of approximately nine feet is desired. For a shorter reach or a longer reach the length of the links can be changed or the total number of links installed can be varied. It is naturally understood that the total length of the cable installed should also be adjusted.

The drum safety lock 78 includes the mounting plate 150 which can be bolted or welded to the upper surface of the side rail 34 of the support framework 12. As extra reinforcement an L-shaped clip 152 can be welded both to the side rail as well as the mounting plate 150. A U-shaped channel 154 is mounted in an elevated, central position on the mounting plate 150. A locking arm 156 is pivotally mounted by a suitable bolt or shaft 158 passing through aligned holes in the U-shaped channel 154 as well as the mounting plate 150. The locking arm 156 is mounted at a point which is closer to the end 160 rather than the opposite end 162. The reason for this positioning is so that the outer end 162 is inherently pulled downwardly by gravity so that it always moves to a locked position in case of failure.

An adjusting screw 164 is provided to limit the downward movement of the locking arm 156 with respect to the drum. A solenoid 166 is suitably mounted on the mounting plate 150 with the armature 167 connected to the end 160 of the locking arm 156 by means of a connecting wire 168. A micro-switch 170 is attached to the mounting plate at a suitable position to sense the downward movement of the end 160 of the locking arm 156 caused by the actuation of the solenoid 166.

The mounting plate 150 for the drum safety lock 78 is positioned adjacent to the end of the cable drum assembly 30. Although the safety lock can be mounted on either end of the drum it is usually mounted on the end opposite the motor-chain drive assembly. In this way, the drum safety lock will not interfere or be restricted by the drive assembly.

The end 162 of the locking arm 156 is chamfered at a downward angle as shown in FIG. 6. This angle can be any acute angle but is preferably within the range of 30° to 60°. An actuating deflector 171 is provided along the side of the locking arm 156 and is arranged in a slightly more acute angle than the end 162. A lock stop 172 is rigidly and permanently attached as by welding, to the surface of the drum. The stop 172 can be a solid block of metal which is curved to substantially correspond to the outer circumference of the cable drum assembly 30. The face 173 of the stop 172 is set at an angle to the surface of the drum. This angle generally corresponds with the angle of the end 162 of the locking arm 156. Thus, the end 162 and the stop face 173 engage in generally full contact when the locking arm 156 is placed in a lowered position in contact with the stop 172. The acute angle on the end 162 of the arm 156 and the corresponding angle on the face 173 of the stop 172 causes the locking arm to engage the stop so as to be wedged inward towards the surface of the drum to prevent the locking arm from sliding off or disengaging from the stop. This angular relationship greatly enhances the actuation reliability of the locking mechanism.

A pawl 174 is pivotally mounted by a bolt 176 threaded into an aperture provided in this side of the stop 172. The pawl 174 is formed in a curved configuration which has a diameter of curvature which is slightly larger than the diameter of the cable drum. The pawl 174 is elevated slightly from the surface of the drum assembly 30 with the pivot bolt 176 positioned at a point which is closer to the end 180 than the opposite end 178. This allows the end 178 to be biased downward by gravity into a position where it contacts the surface of the drum during each normal rotation of the drum. The edge of the outer end 178 of the pawl 174 is also formed with an acute angle which matches the angular position of the deflector 171 on the locking arm 156.

In operation, when the cable drive motor 28 is energized to lower the carriage the solenoid 166 is also energized simultaneously. This causes the armature 167 to retract into the solenoid 166 which causes the wire 168 to pull the end 160 of the locking arm 156 into a downward position. This raises the outer end 162 of the locking arm 156 to a position where it clears the lock stop 172 and pawl 174 mounted on the cable drum assembly 30. This upwardly raised position is illustrated in FIG. 7. The microswitch 170 is closed when the locking arm 156 is in this position. This microswitch when closed allows the continued actuation of the motor and the rotation of the drum. As can be seen in FIG. 7 the drum can now rotate in the counterclockwise direction which extends the cable and lowers the carriage assembly and the projector. In normal operation, the locking arm 156 will remain raised during any time that the cable drum assembly is rotated in the down direction. If power to the actuation solenoid 166 is lost during normal lowering operation, the end 162 of the arm 156 will rotate downward into contact with the stop 172 any time the cable assembly rotates in the counterclockwise direction.

As seen in FIGS. 8 and 9, in an emergency situation where possibly the motor brake fails or the drive chain comes loose while the solenoid 166 is energized, the cable drum assembly 30 will rotate counter-clockwise allowing the carriage and projector to descend rapidly. As the speed of the drum 30 increases the pawl 174 will swing outwardly by centrifugal force which will cause the pawl 174 to engage the deflector plate 171 on the side of the locking arm 156. This engagement and the continued rotation of the drum 30 will cause the arm 156 to be forced downward causing end 162 of the arm to impact and engage the face of the stop block 172. This contact between the stop block 172 and the end of the locking arm 156 will wedge the end of the arm 156 between the stop block 174 and the surface of the drum 30. This wedging and blocking action will immediately stop the rotational movement of the drum 30 and locking the drum to prevent it from rotating further and stopping the descent of the carriage and projector. This is a fail safe device in that either lose of electrical power and/or a mechanical failure in the drum drive assembly can be quickly arrested.

When the cable drum assembly 30 is rotating in the clockwise direction to raise the carriage, the position of the locking arm 156 is immaterial. The lowered locking arm 156 will merely ride over the top of the stop block 172 allowing the drum to rotate in this direction without interference.

It is to be understood that the drum safety lock mechanism which is shown and described in this application can be used in other drum operated lifting mechanisms. Thus, this same mechanism can be used in a number of different applications such as passenger elevators, mine shaft hoists and other instances where rotational movement in an emergency situation needs to be arrested.

Figure 10:
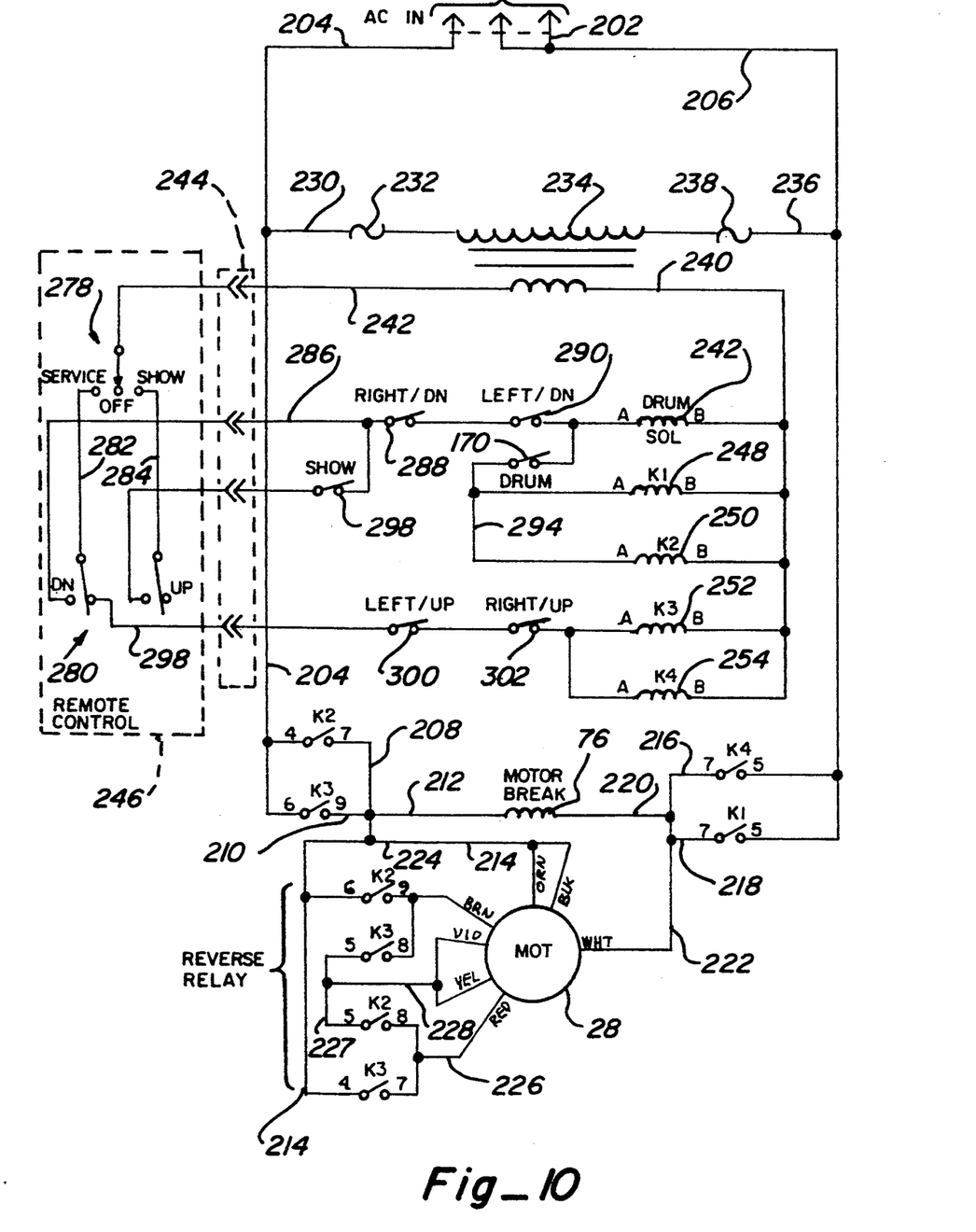
FIG. 10 is schematic showing the control circuitry for the improved projector lifting device.

FIG. 10 shows a schematic of the electrical power circuitry and the control circuitry utilized for the operation of the lifting device according to the present invention. Although the motor and control circuits can be operated from a 220 volt AC power source, the present description will be directed to a 110 volt AC system.

Electrical power for the lifting device is fed into junction connector 202 to which is connected power lead 204 and common lead 206. With a lifting device of this type, the junction connector 202 can be hard wired directly to a suitable power source within the building structure. For the purpose of illustration the power lead 204 is the "hot" side of the AC circuit while common lead 206 is the "return" or "ground" side of the circuit. The power lead 204 is connected directly to normally open contacts 4 and 6 on relays K2 and K3, respectively. Lead 208 connected to contact 7 of relay K2 and lead 210 connected to contact 9 on relay K3 are connected through lead 214 to the armature of the motor 28 while lead 212 is connected to one side of the motor brake 76. The common power lead 206 is connected to the normally open contacts 5 and 5 on relays K4 and K1, respectively. Leads 216 and 218 are connected to contacts 7 and 7 on K4 and K1, respectively, and are in turn connected through lead 220 to the motor brake 76 and through lead 222 to the common power lead on motor 28.

Relays K2 and K3 are intended for controlling the direction of rotation of the motor 28. Power lead 214 is split and is connected to contact 6 on relay K2 and contact 4 on relay K3.

The K1 relay is called the "down common" relay while the K4 relay is called the "up common" relay. These two relays break the common power lead 206 to the motor 28. The K2 and K3 relays are used for reversing the motor windings and thus the operating direction of the motor. The K2 relay is designated as the "down" relay while the K3 relay is the "up" relay. Split lead 224 is connected to normally open contact 9 on relay K2 and in turn is connected to contact 8 on K3 as well as a field lead connection on the motor 28. Normally open contact 7 on K3 is connected by split lead 226 to the normally open contact 8 on relay K2 as well as a second field lead on the motor 28. Lead 227 connects contact 5 on the K2 relay to contact 5 on the K3 relay while lead 228 is connected to lead 227 and directly to the common field leads on the motor 28.

The control circuitry for the lifting device includes lead 230 which is connected through fuse 232 to the primary windings of the step down transformer 234. Lead 236 is connected to common lead 206 and in turn is connected to the primary windings of the step down transformer 234 through the fuse 238. Step down transformer 234 is designed so that the secondary windings of the transformer provide 24 volts AC for powering the relays, limit switches and control circuitry in either the 110 or 220 VAC system. Control lead 240 connects the one side of the secondary windings of the step down transformer 234 to the drum brake solenoid 242 as well as the action solenoids for relays K1, K2, K3 and K4. Control lead 242 is connected to the opposite side of the secondary winding of the transformer 234 and is connected through a coupling connector 244 to a remote control unit 246 for controlling the operation of the lifting device. The remote control box 246 can be wired at the end of a long cable or if desired can be hard wired into a wall mounted control box within the presentation area. Either way the operation of the lifting device will be substantially the same.

Lead 242 can be wired through the connector 244 to a three position single pole key switch 278 which has positions for "off", "show" and "service". The service contact on the key switch 278 is connected by lead 282 to one common contact on a double pole, double throw switch 280. Lead 286 connected to the "down" contact of the service side of switch 280 is in turn connected through normally closed right/down limit switch 288, normally closed left/down limit switch 290, to one side of the normally open drum limit switch 292 and the armature of the drum lock solenoid 242. The other side of the drum lock limit switch 170 is connected by lead 294 to the armatures of relays K1 and K2. The "down" contact for the show side of the switch 280 is connected by lead 288 through the normally closed show position limit switch 298 to lead 286. The "up" contacts on both the service and show sides of the switch 280 are connected by lead 296 through the normally closed left/up limit switch 300 and normally closed right/up limit switch 302 to the armatures of relays K3 and K4.

The step down transformer 234 as well as the relays are normally contained within the control box 64. The left/down limit switch 290 is shown in FIG. 5 attached to the side of the bracket 56 supporting the guide 52. As the carriage structure 14 moves downward the end of the link 130 moves towards the limit switch 290. Upon reaching the full extent of its travel in the slot 60 the end of the link 130 will contact the limit switch 290 causing it to open and deenergize the motor 28. The right/down limit switch 288 is positioned on the opposite side of the support framework 12. The left/up limit switch 300 is positioned approximately midway along the upper edge of the side rail 32. An adjustable arm is arranged to contact the cross support member 98 of the carriage structure 14 as it is raised to its uppermost position. The arm in turn contacts and actuates the switch 300. The right/up limit switch 302 is arranged in a similar fashion on the right side rail 34. The show position limit switch 298 is mounted along side rail 34 on a slidable bracket which can be locked in a desired position by a thumb screw. The limit switch 298 can be moved along the slot 62 to a proper position where it will contact the end of the upper most link in the stabilizer mechanism 16 when the carriage has reached the desired heights within the auditorium or presentation area. When the key switch 278 is in the service position, the show position limit switch 298 is bypassed allowing the carriage and projector to be extended to the full length of the cable assembly and stabilizer mechanisms when desired. In the service position the down limit switches become the final controlling factor.

The movement of the double pole, double throw control switch 280 from the up or down position causes the direction relays K2 and K3 to be properly energized to control the rotational direction of the motor 28. The K2 and K3 relays accomplish this function by merely reversing the connections on the field windings of the motor 28. This can be seen in FIG. 10 where the actuation of relay K2 causes contacts 6, 9 and 5, 8 to be closed causing the motor to rotate in a direction allowing the carriage to be lowered. By the same token, the energizing of relay K3 closes the contacts 5, 8 and 4, 7 of this relay reversing the electrical connection of the windings causing the motor to rotate in the opposite direction causing the carriage structure to move upward.

Thus, with the remote control box the person in charge of installing and removing the projector from the lifting device or the presenter who is responsible for lowering the projector to the required show position can easily control the operation of the lifting device. The overall operation and control of the device has been made to operate as simply as possible and yet be fail safe with the inclusion of limit switches and the drum safety lock. With these features a very desirable and easily operated projector lifting device is provided.

While a lifting device for projectors and other audio visual apparatus has been shown and described in detail, it is to be understood that this invention is not to be limited to the exact form or circuit disclosed and changes in detail and construction of the invention may be made without departing from the spirit thereof.

I claim:

1. An improved lifting device for suspending from and concealing an object within a ceiling structure of an enclosure, the lifting device comprising:
   a) support framework means including means for mounting the framework means within the ceiling structure whereby the lifting device will be completely concealed when in a raised position;
   b) carriage structure means including an object mounting means whereby the object is at least partially recessed within said carriage structure means;
   c) cable drum means mounted on said support framework means, said cable drum means having at least one cable attached to said carriage structure means so as to support the carriage structure means from said support framework means, said cable drum means includes a drive means to controllably rotate the cable drum means to lower or raise the cable and the carriage structure means between a lowered position where the object can be mounted on said carriage structure means and a raised position wherein the carriage means is in a nested position with said support framework means;
   d) stabilizing means mounted between the support framework means and the carriage structure means to restrict lateral movement of the carriage means when the carriage means and object are suspended in a position between said lowered position and said raised position, said stabilizing means being arranged to allow the support and carriage means to be closely coupled in the raised position to minimize the overall height of the lifting device;
   e) said carriage structure means includes a pair of spaced parallel side members and said object mounting means is an inverted U-shaped bracket connected between said side members, said U-shaped bracket being adapted to mount and support the object whereby the object will be at least partially recessed between and above the side members of said carriage structure means to facilitate the concealment of the object and lifting device within the ceiling structure; and
   f) said parallel side members having an outside surface arranged opposite the inverted U-shaped bracket, said stabilizing means is mounted to the outside surface of at least one of said spaced parallel side members so that the carriage structure means in the raised position is recessed within the stabilizing means to allow the carriage structure means and mounted object to be recessed within the lifting device and concealed within the ceiling structure.

2. A lifting device as defined in claim 1 wherein the support framework means includes a rectangular outer frame, a pair of side rails and a pair of cross members interconnecting the side rails near their ends make up the outer frame.

3. An improved lifting device as defined in claim 2 wherein the cable drum means is mounted transversely between said side rails, and said cable drum means is mounted substantially intermediate the length of said side rails.

4. A lifting device as defined in claim 1 wherein said drive means is a reversible motor means which includes a direct drive means connected to said cable drum means whereby the cable drum means is positively connected to the motor means to prevent cable drum means rotation independent of the motor means.

5. A lifting device as defined in claim 4 wherein the direct drive means between said cable drum means and said motor means is a chain drive means having a power chain interconnecting a sprocket provided on each of said cable drum means and said motor means.

6. A lifting device as defined in claim 1 wherein said cable drive means including an elongated cable drum and two cables mounted on said drum, each of said cables being located at opposite ends of said drum with an end of each cable attached to said carriage means.

7. A lifting device as defined in claim 1 wherein the said stabilizing means is a pair of scissor-like linkage mechanisms, each mechanism being mounted to the outside surface of one of said side members and suitably attached to said support framework means whereby as the carriage structure means is raised into contact with said support framework means the linkage mechanisms will fold into a minimum height configuration to maintain a low overall height for said lifting device.

8. A lifting device as defined in claim 1 which further includes an electrical control means to control said drive means to controllably rotate the cable drum and lower and raise the carriage structure means to a desired position.

9. A lifting device as defined in claim 8 wherein said electrical control means includes a plurality of limit switch means which are located with respect to said stabilizing means to disengage the drive means when the carriage structure means reaches either the lowered position or the raised position.

10. A lifting device as defined in claim 9 wherein said limit switch means includes an adjustably located switch means which can be positioned to disengage the drive means when the carriage support means and object reach a desirable intermediate position for use.

11. An improved lifting device for suspending and concealing a visual aid projector from within a ceiling structure and enclosure, said enclosure having a ceiling surface below said ceiling structure and a floor or support surface spaced downwardly from said ceiling surface, said lifting device being capable of being raised and concealed within said ceiling structure and lowered to a position near the floor surface so that the projector can be easily installed and removed from the lifting device, said lifting device being capable of installation and concealment within a minimal overhead clearance available within the ceiling structure, the lifting device comprising:
   a) support framework means having means for attaching the framework means to said structure whereby the entire lifting device is concealed within said ceiling structure when in a raised position;
   b) carriage structure means having means for mounting said projector in at least a partially recessed position within said carriage structure means, said carriage structure means includes a pair of spaced parallel side members and said projector mounting means is an inverted U-shaped bracket connected between said side members, said side members having an outside surface which forms the perimeter of the carriage structure means and is opposite said U-shaped bracket, said projector when mounted in said inverted U-shaped bracket is recessed upwardly between said side members to minimize the overall height of the device and to allow the projector and lifting device to be concealed within said ceiling structure;
   c) cable drum means mounted on said support framework means and having at least one cable extending from said cable drum means to said carriage structure means so as to support the carriage structure means, said cable drum means including a drive means to controllably rotate the drum means to lower or raise the cable and the carriage structure means between a lowered position near the floor of said enclosure where the projector can be installed or removed to a raised position where the carriage structure means is positioned above said ceiling surface whereby it is concealed within said ceiling structure;
   d) stabilizing means mounted between said support framework means and said carriage structure means to restrict the lateral movement of the carriage means when the carriage means and projector are suspended in an intermediate position between said raised and lowered positions; and
   e) the support framework means includes at least two parallel side rails, said side rails having an outside which is the perimeter of the support framework means and which correspond to the side members of the carriage means, and said stabilizing means is mounted on the outside surface of the side members and side rails to allow the carriage means and mounted projector to be enveloped within the stabilizing means so as to minimize the overall total height of the lifting device when in the raised position.

12. A lifting device as defined in claim 11 wherein said cable drum means is mounted between said side rails at a point which is intermediate to the overall length of each of the side rails.

13. A lifting device as defined in claim 12 wherein said side members are of equal length and said cross members are of equal length.

14. A lifting device as defined in claim 11 wherein said stabilizing means includes a pair of scissor-like linkage mechanisms which are mounted on each side of the carriage structure means to the outside surface of a side member, said support framework means having two side rails of equal length and two cross members of equal length, said side rails and cross members being attached at their ends to form a rectangular frame, said pair of scissor-like linkage mechanisms are attached to the outside surface of the side rails of said support framework means whereby the linkage mechanisms will extend and retract according to the lowering and raising of said carriage support means whereby the carriage structure means will be stabilized to prevent lateral movement while the carriage structure means is moving or suspended in an extended position.

15. A lifting device as defined in claim 11 wherein the drive means for said cable drum means includes a reversible electric motor which further includes a direct drive means connected to said cable drum means to raise and lower the carriage structure means.

* * * * *